United States Patent [19]

Blanchard et al.

[11] Patent Number: 5,763,106
[45] Date of Patent: Jun. 9, 1998

[54] COMPOSITE POWDER AND METHOD FOR FORMING A SELF-LUBRICATING COMPOSITE COATING AND SELF-LUBRICATING COMPONENTS FORMED THEREBY

[75] Inventors: Cheryl Renee Blanchard; Richard Allen Page, both of San Antonio, Tex.

[73] Assignee: Hino Motors, Ltd., Hino, Japan

[21] Appl. No.: 588,733

[22] Filed: Jan. 19, 1996

[51] Int. Cl.$^6$ ........................................... B32B 9/00
[52] U.S. Cl. ..................... 428/570; 428/209; 428/357; 428/367; 428/403; 428/408; 428/469; 428/546; 428/551; 428/553; 428/564; 419/10; 419/19; 419/38; 419/66; 508/113; 508/129; 508/161; 75/228; 75/252
[58] Field of Search .................... 428/564, 553, 428/552, 209, 403, 325, 570, 548, 367, 554, 408, 908.8, 469, 389, 405, 546, 551, 357; 419/10, 14, 38, 19, 64, 66, 35; 508/129, 155, 161, 171, 116, 167, 113; 75/231, 252, 228

[56] References Cited

U.S. PATENT DOCUMENTS

| | | | |
|---|---|---|---|
| 4,728,448 | 3/1988 | Sliney | 252/12.2 |
| 5,325,732 | 7/1994 | Vogel | 74/424.8 |
| 5,484,662 | 1/1996 | Rao | 428/553 |

FOREIGN PATENT DOCUMENTS

| | | |
|---|---|---|
| 0725158A1 | 8/1996 | European Pat. Off. |
| 1297805 | 11/1972 | United Kingdom |
| 1520184 | 8/1978 | United Kingdom |

OTHER PUBLICATIONS

W. Wei, et al., "Characterization on ion beam modified ceramic wear surfaces using Auger electron spectroscopy," *Journal of Materials Science*, 22 (1987) 2387–2396.

William Wei, et al., "High Temperature Lubrication of Ceramics by Surface Modification," *Surface and Coatings Technology*, 37, (1989) 179–182.

William Wei, et al., "Friction and Wear Testing of Ion Beam Modified Ceramics for High Temperature Low Heat Rejection Diesel Engines," *Special Technology Publication 1010, American Society for Testing and Materials*, (1988) 345–350.

C.R. Blanchard–Ardid, et al., "Surface ad Bulk Oxidizing Species of Self Lubricating Ceramics," *Mat. Res. Soc. Symp. Proc.*, 140, (1989) 2069–2078.

J. Lankford, et al., "Friction and wear behavior of ion beam modified ceramics," *Journal of Materials Science*, 22, (1987) 2069–2078.

Cheryl R. Blanchard, et al., "Effect of Silicon Carbide Whisker and Titanium Carbide Particulate Additions on the Friction and Wear Behavior of Silicon Nitride," *Journal of the American Ceramic Society*, 73:11 (Nov. 1990) 3442–3452.

C.R. Blanchard–Ardid, et al., "Improved Contact Damage Resistance of a $SI_3N_4/TiC/SiC_{wh}$ Composite," *Ceram. Eng. Sci. Proc.*, 9, (1988) 1443–1451.

R.A. Page, et al., "Effect of Particulate additions on the contact damage resistance of hot–pressed $Si_3N_4$," *Journal of Materials Science*, 23, (1988) 946–957.

R.A. Page, et al., "Development of Self Lubricating Ceramics Using Surface and Bulk Oxidizing Species," *Advances in Engineering Tribology*, SP–31, (1990) 145–150.

*Primary Examiner*—Patrick Ryan
*Assistant Examiner*—Abraham Bahta
*Attorney, Agent, or Firm*—Madan & Morris, PllC

[57] ABSTRACT

The present invention provides a ceramic based composite powder and a method for applying the composite powder using a H.V.O.F. gun to form a self-lubricating coating for metal parts. The composite powder and coating are comprised of a ceramic powder, a metal powder, and a solid lubricant powder.

22 Claims, No Drawings

COMPOSITE POWDER AND METHOD FOR FORMING A SELF-LUBRICATING COMPOSITE COATING AND SELF-LUBRICATING COMPONENTS FORMED THEREBY

SPECIFICATION

FIELD OF THE INVENTION

The present invention relates to composite powders, methods for forming composite coatings, and composite coatings for reducing wear in components exposed to friction during service. More particularly, the invention relates to solid lubricant coatings which reduce the coefficient of friction and wear in metal parts, such as piston rings and cylinder liners.

BACKGROUND OF THE INVENTION

The continued demand for oil-free sliding surfaces in the transportation and utilities industries has resulted in the development of advanced materials and component designs. Compressor design research has focused on the production of oil-free air or gas compressors that will decrease routine maintenance requirements. Engine design research has focused on increasing the durability of engine parts by reducing wear and friction on the piston ring and cylinder liner under severe temperature and pressure conditions. Diesel engine research has focused on the development of piston rings and cylinder liners that require little or no lubricating oil, thus decreasing oil consumption and significantly reducing the particulate exhaust emissions contributed by diesel engines. Both advanced compressors and engines require unlubricated or boundary-lubricated piston rings and cylinder liners with low friction and wear characteristics.

Unlubricated sliding surfaces will operate only with surfaces having low friction and wear properties and acceptable reliability and durability properties. The mechanical and chemical stability of ceramics have made ceramic materials a prime candidate for use in structural parts that do not require lubrication. Unfortunately, unlubricated ceramics suffer from poor friction and wear properties and unreliable mechanical integrity. These limitations have restricted the use of ceramics in critical applications, such as piston rings and cylinder liners.

Techniques for successfully using ceramics for high friction components would be highly desirable.

SUMMARY OF THE INVENTION

The present invention provides a ceramic based composite powder and a method for applying the composite powder, preferably using a high velocity oxy-fuel (HVOF) gun to form a self-lubricating composite coating for metal parts. The composite powder and coating are comprised of a ceramic phase, a metal phase, and a solid lubricant phase.

DETAILED DESCRIPTION OF THE INVENTION

The present invention provides a particulate composite powder that may be applied using a number of coating techniques, preferably an HVOF gun. The result is a self-lubricating coating for metal components that are exposed to friction during service. Substantially any metal may be coated according to the present invention. Preferable metal substrates include, but are not necessarily limited to, cast iron and steel.

The composite powder is a particulate mixture of a ceramic, a metal, and a solid lubricant. The ceramic used in the mixture may be substantially any carbide. Examples of suitable carbides include, but are not necessarily limited to, chromium carbide, silicon carbide, boron carbide, tungsten carbide, and titanium carbide. Preferred ceramics are chromium carbide and tungsten carbide.

The metal used in the mixture may be any combination of nickel and chromium. A preferred metal is an 80–20 wt % mixture of nickel and chromium.

Solid lubricants that are useful in the mixture include, but are not necessarily limited to, molybdenum disulfide, lead oxide, silver, graphite, and titanium oxide. A preferred solid lubricant, which is particularly useful when coating cast iron cylinder liners, is molybdenum disulfide.

The composite powder should comprise a mixture of: (a) between about 25–75 vol % of a ceramic powder, preferably a carbide powder, most preferably between about 60–70 vol % of a chromium carbide powder; (b) between about 5–50 vol % of metal powder, preferably between about 15–25 vol % of a metal powder comprising an 80–20 wt % alloy of nickel and chromium powder; and, (c) between about 2–25 vol % of a solid lubricant powder, preferably between about 10–20 vol % molybdenum disulfide powder. In a most preferred embodiment, the composite powder comprises about 65% chromium carbide powder, about 15 vol % molybdenum disulfide powder, and about 20 vol % of a metal powder comprising an 80–20 wt % alloy of nickel and chromium. A preferred composite powder should have minimal iron as a contaminant.

The ceramic or ceramic carbide acts as an abrasion resistant phase in the composite coating. When the composite powder contains less than 25 vol % of the carbide powder, the abrasion resistance is insufficient to provide adequate wear resistance to the coating. In addition, when the coating contains more than 75 vol % of the carbide phase, the coating is extremely wear resistant, but it is also extremely aggressive to the opposite wear member, resulting in high wear rates of the opposing surface (for example, the piston rings). Accordingly, the composite powder should contain about 25–75 vol % of the ceramic carbide powder.

The metal phase provides integrity and toughness to the composite coating. When the composite powder contains less than 5 vol % of the metal powder, the coating does not have sufficient integrity to remain intact. In addition, when the coating contains more than 50 vol % of the metal phase, the coating has low wear resistance due to the insufficient amount of ceramic phase. Accordingly, the composite powder should contain about 5–50 vol % of the metal powder.

The solid lubricant phase acts as a continuous lubricant to the wear couple and allows for a decrease in or elimination of conventional oil lubricants. When the composite powder has less than 2 vol % of the lubricating phase, the lubricating action is insufficient. In addition, when it contains more than 25 vol % of the solid lubricant, the coating lacks in integrity and wear resistance. Accordingly, the composite coating should comprise about 2–25 vol % of the solid lubricant powder.

A preferred embodiment, which is particularly useful when coating cast iron cylinder liners, uses a product that is a combination of ceramic and metal called a CERMET. A CERMET is some combination, preferably a 80–20 ceramic-metal combination, of chromium carbide (ceramic) and nickel-chromium (metal). CERMET powders are available, for example, from Miller Thermal, Inc., 555T Communication Drive, Appleton, Wis., 54915. The composite powder created using a CERMET powder and a solid lubricant powder comprises a mixture of about 85 vol % CERMET and about 15 vol % molybdenum disulfide powder.

Ceramic, metal, and solid lubricant powders are available from a number of commercial sources. For example, chromium carbide powder is available from Aithaca Chemical Corp., 50 Charles Lindbergh Blvd., Suite 400, Uniondale, N.Y. 11553; chromium is available as a metal powder from Aithaca Chemical Corp. and from Spectrum Chemical Mfg. Corp., Gardena, Calif.; nickel is available as a metal powder from Belmont Metals, Inc., 327 Belmont Ave., Brooklyn, N.Y. 11207; and, molybdenum disulfide powder is available from GFS Chemicals, Inc., P. O. Box 245, Powell, Ohio 43065.

The composite powder may be applied using a number of known coating processes. A preferred process uses a high velocity oxy-fuel (HVOF). Other suitable coating methods include, but are not necessarily limited to, Low Pressure Plasma Spray (LPPS) and the use of a Detonation gun (D-gun). The invention will be described in terms of HVOF application, but the invention is intended to include other suitable methods of application.

First, the substrate should be cleaned using standard thermal spray surface preparation techniques. A preferred technique for cleaning the substrate is grit blasting using aluminum oxide grit, size 24 or 36, at about 3515–4219 g/cm$^2$ (50–60 psi). This preparation technique both cleans the substrate and increases the surface area for bonding. The surface to be treated should be preheated to about 93° C. (200° F.). The surface temperature may be measured using known procedures, such as contact or infrared measurements.

In a preferred embodiment, the composite powder is sized by standard screening using a −325/+15 mesh screen. The composite powder is loaded into the powder feed hopper of a Jet Kote type H.V.O.F. gun, available from Stellite coatings, Deloro Stellite, Inc., 1201 Eisenhower Dr. N, Goshen, Ind. 46526, and the parameters of spraying should be set. The gun parameters should be sufficient to heat the composite powder to above its melting point, which will vary according to the particular composition. The gun preferably should have a nozzle of about 0.635 cm×15.24 cm (¼"×6"). The fuel gases preferably should be: hydrogen at about 8436.8 g/cm$^2$ (120 psi), 8652.6 cm$^3$/sec (1100 standard cubic feet/hr, or "scfh"), and oxygen at 8436.8 g/cm$^2$ (120 psi), 5112.9 cm$^3$/sec (650 scfh). The carrier gas preferably should be argon at 5976.1 g/cm$^2$ (85 psi), 314.64 cm$^3$/sec (40 scfh). The spray distance preferably should be about 25.4 cm (10"). Each pass should deposit a coating about 5–8 micrometers (0.0002–0.0003") in thickness. In order to achieve a 150 micrometer coating (0.006"), approximately 20–25 passes will be required. During this procedure, the temperature of the substrate should be monitored and maintained below about 400° F.

The invention will be more clearly understood with reference to the following example, which is illustrative only, and should not be construed as limiting the present invention:

EXAMPLE 1

Bench Tests

The solid lubricants chosen for initial screening were $MoS_2$, PbO, graphite, and Ag. The test matrix used for the solid lubricant evaluation is shown in Table I:

TABLE I

Test Matrix for Solid Lubricant Evaluation

| Flat | Solid Lubricant | Lubricating Condition |
|---|---|---|
| $Cr_3C_2$ (CI)* | $MoS_2$ | Dry |
| $Cr_3C_2$ (CI) | $MoS_2$ | Lubricated** |
| $Cr_3C_2$ (CI) | PbO | Dry |
| $Cr_3C_2$ (CI) | PbO | Lubricated |
| $Cr_3C_2$ (CI) | Graphite | Dry |
| $Cr_3C_2$ (CI) | Graphite | Lubricated |
| $Cr_3C_2$ (CI) | Ag | Dry |
|  | Ag | Lubricated |
| $Cr_3C_2/NiCr_{HVOF}$ (CI)*** | $MoS_2$ | Dry |
| $Cr_3C_2/NiCr_{HVOF}$ (CI) | $MoS_2$ | Lubricated |
| $Cr_3C_2/NiCr_{HVOF}$ (CI) | PbO | Dry |
| $Cr_3C_2/NiCr_{HVOF}$ (CI) | PbO | Lubricated |
| $Cr_3C_2/NiCr_{HVOF}$ (CI) | Graphite | Dry |
| $Cr_3C_2/NiCr_{HVOF}$ (CI) | Graphite | Lubricated |
| $Cr_3C_2/NiCr_{HVOF}$ (CI) | Ag | Dry |
|  | Ag | Lubricated |

*$Cr_3C_2$ (CI) refers to a chromium carbide coating on a cast iron substrate.
**Lubrication was provided by standard lubricating oil.
***$Cr_3C_2/NiCr_{HVOF}$ (CI) refers to a chromium carbide/Nichrome coating applied to a cast iron substrate using an HVOF gun.

The four solid lubricants were deposited on the coated substrates using ion beam assisted deposition for the PbO, $MoS_2$, and graphite, and arc ion plating for the Ag. These techniques are not described in detail because they were not chosen for the final deposition process. The solid lubricants were all evaluated, both lubricated and dry, versus TiN coated steel pins using a bench top wear test. The test conditions used for evaluating the wear couples are shown in Table II:

TABLE II

Bench Test Conditions

| Lubricated Conditions: | |
|---|---|
| Applied Normal Load | 15N |
| Reciprocating Velocity | 8 cm/sec |
| Temperature | 155° C. (311° F.) |
| Duration | 4 hours |
| Oil Volume | 0.4 µl |
| Atmosphere | Laboratory Air |
| Dry Conditions: | |
| Applied Normal Load | 15N |
| Reciprocating Velocity | 8 cm/sec |
| Temperature | 155° C. (311° F.) |
| Duration | 4 hours |
| Oil Volume | None |
| Atmosphere | Laboratory Air |

The coefficient of friction, pre- and post-test surface roughness ($R_a$ in µm), mass change of the flat sample, and wear scar size of the pin and flat were used to rank the solid lubricants. The results of each test are included in Tables III and IV, below.

TABLE III

| Flat | μf initial<br>μf final<br>μf average | $R_a$ (μm)<br>Pre-Test<br>Post-Test | Wt. Change<br>($10^{-5}$ g)<br>Flat<br>Pin | Pin Wear Scar Dimensions (μm)<br>A = perpendicular to sliding direction<br>B = parallel to sliding direction | Flat Wear Scar Width (μm)<br>A = primary scar<br>B = including minor damage at edges |
|---|---|---|---|---|---|
| $Cr_3C_2$/$MoS_2$ | 0.09<br>0.11<br>0.11 | 0.21<br>0.18 | 380<br>5 | A = 105<br>B = 250 | A = 260<br>B = 260 |
| $Cr_3C_2$/PbO | 0.12<br>0.12<br>0.12 | 0.16<br>0.30 | 209<br>6 | A = 280<br>B = 500 | A = 200<br>B = 260 |
| $Cr_3C_2$/Ag | 0.16<br>0.14<br>0.13 | 1.40<br>1.08 | 132<br>25 | A = 500<br>B = 550 | A = 210<br>B = 2670 |
| $Cr_3C_2$/graphite | 0.10<br>0.11<br>0.11 | 0.22<br>0.19 | 586<br>10 | A = 575<br>B = 500 | A = 625<br>B = 625 |
| $Cr_3C_2$/NiCr/$MoS_2$ | 0.12<br>0.12<br>0.12 | 0.36<br>0.89 | 229<br>13 | A = 590<br>B = 650 | A = 290<br>B = 1250 |
| $Cr_3C_2$/NiCr/PbO | 0.13<br>0.12<br>0.12 | 0.33<br>0.30 | 213<br>4 | A = 110<br>B = 175 | A = 275<br>B = 1000 |
| $Cr_3C_2$/NiCr/Ag | 0.15<br>0.12<br>0.12 | 1.00<br>0.68 | 116<br>39 | A = 310<br>B = 320 | A = 350<br>B = 1275 |
| $Cr_3C_2$/NiCr/graphite | 0.09<br>0.12<br>0.12 | 0.14<br>0.125 | 1095<br>4 | A = 550<br>B = 525 | A = 625<br>B = 625 |

TABLE IV

| Flat | μf initial<br>μf final<br>μf average | $R_a$ (μm)<br>Pre-Test<br>Post-Test | Wt. Change<br>($10^{-5}$ g)<br>Flat<br>Pin | Pin Wear Scar Dimensions (μm)<br>A = perpendicular to sliding direction<br>B = parallel to sliding direction | Flat Wear Scar Width (μm)<br>A = primary scar<br>B = including minor damage at edges |
|---|---|---|---|---|---|
| $Cr_3C_2$/$MoS_2$ | 0.81<br>1.27<br>1.14 | 0.20<br>0.31 | 27<br>0 | A = 725<br>B = 760 | A = 500<br>B = 740 |
| $Cr_3C_2$/PbO | 0.34<br>1.18<br>0.63 | 0.41<br>0.21 | 5<br>-1 | A = 440<br>B = 460 | A = 490<br>B = 1210 |
| $Cr_3C_2$/Ag | 1.12<br>1.13<br>1.18 | 1.30<br>0.70 | 4<br>7 | A = 400<br>B = 775 | A = 200<br>B = 2750 |
| $Cr_3C_2$/graphite | 0.36<br>0.47<br>0.42 | 0.16<br>0.22 | -5<br>0 | A = 400<br>B = 410 | A = 375<br>B = 610 |
| $Cr_3C_2$/NiCr/$MoS_2$ | 0.63<br>1.19<br>0.64 | 1.31<br>1.05 | -40<br>2 | A = 525<br>B = 625 | A = 460<br>B = 460 |
| $Cr_3C_2$/NiCr/PbO | 0.50<br>0.67<br>0.60 | 0.19<br>0.74 | 22<br>5 | A = 375<br>B = 160 | A = 310<br>B = 940 |
| $Cr_3C_2$/NiCr/Ag | 0.63<br>0.62<br>0.52 | 0.98<br>0.67 | 38<br>25 | A = 190<br>B = 590 | A = 300<br>B = 1290 |
| $Cr_3C_2$/NiCr/graphite | 0.31<br>0.49<br>0.42 | 0.50<br>1.60 | -49<br>-3 | A = 475<br>B = 610 | A = 375<br>B = 560 |

+positive sign = weight gain; negative sign = weight loss.

Based on the foregoing results, the PbO and $MoS_2$ solid lubricants were chosen for further composite coating development. To produce the self-lubricating composite coatings, two mixtures were made. In the first mixture, 85 vol % of $Cr_3C_2$/NiCr powder was mixed with 15 vol % of the PbO powder. In the second mixture, 85 vol % of $Cr_3C_2$/NiCr powder was mixed with 15 vol % of $MoS_2$ powder. These mixtures were then used as the powder feed for HVOF spraying onto "test coupons" of cast iron.

Upon receipt of the coated samples from the vendor, it was determined by Energy Dispersive Spectroscopy (EDS) that the PbO had not been retained during plasma spraying. In addition, PbO became a concern due to toxicity issues. Based on these combined factors, further evaluation of the PbO composite coating was suspended, and the $MoS_2$ remained as the solid lubricant candidate for final evaluation.

It was further determined that the $Cr_3C_2$/NiCr powder was more amenable to plasma spraying than the $Cr_3C_2$ powder, and thus $Cr_3C_2$/NiCr powder was used as the matrix for the $MoS_2$ lubricant.

Compressor Test

Following the bench tests, a full scale test of coated components in the oil-free compressor was performed. The $Cr_3C_2$/NiCr powder for this test, supplied by F. W. Gartner Thermal Spraying Co., Houston, Tex., was Miller 1820, a powder obtained from Miller Thermal, Inc., 555T Communication Drive, Appleton, Wis. 54915, which is 80 wt. % $Cr_3C_2$ and 20 wt. % NiCr. The thermal spray mixture, $Cr_3C_2$/NiCr+15 Vol. % $MoS_2$, was processed by adding 85 Vol. % $Cr_3C_2$/NiCr to 15 Vol. % $MoS_2$ powder in a polyethylene mixing jar. The $MoS_2$ powder was supplied by Electronic Space Products International, Agoura Hills, Calif., No. KMR1045, 3N purity. The composition was then thoroughly mixed for 24 hours with no further addition (ex. no liquid or grinding media were added) in a Turbula mixer (Turbular Type T2C, Glen Mills, Inc., 203 Brookdale Street, Maywood, N.J. 07607).

A high velocity oxy-fuel (HVOF) gun was used to apply the composite powder to cast iron cylinder liners. First, the surface to be treated was cleaned by grit blasting using aluminum oxide grit, size 24, at about 50–60 psi. The substrate was preheated to about 93° C. (200° F.).

The composite powder was sized by standard screening using a −325 mesh/+15 mesh screen. The composite powder was loaded into the powder feed hopper of a Jet Kote type H.V.O.F. gun, HY-VEL, with a 0.635 cm×15.24 cm (¼"×6") nozzle. The fuel gases were: hydrogen at about 8436.8 g/cm² (120 psi), 8652.6 cm³/sec (1100 standard cubic feet/hr, or "scfh"), and oxygen at 8436.8 g/cm² (120 psi), 5112.9 cm³/sec (650 scfh). The carrier gas was argon at 5976.1 g/cm² (85 psi), 314.64 cm³/sec (40 scfh). The composite powder was sprayed onto cast iron compressor cylinder liners obtained from Hino Motors, Tokyo, Japan, at a spray distance of about 25.4 cm (10"). Each pass deposited a coating about 5–8 micrometers (0.0002–0.0003") in thickness. In order to achieve a 150 micrometer coating (0.006"), approximately 20–25 passes were required. During this procedure, the temperature of the substrate was monitored and maintained below about 400° F. The resulting composite coating contained $MoS_2$ solid lubricant interspersed throughout the coating.

Following coating, the inside diameter of the cylinder liner was machined to obtain the required dimensional tolerances and surface finish. A compressor was then assembled using (a) piston rings, obtained from Nippon Piston Ring, Japan, which were coated with TiN by Greenfield Industries, P. O. Box 2587, Augusta, Ga., 30913, and (b) the cylinder liner previously prepared with the $MoS_2$-containing, chromium carbide/nichrome composite coating. Following assembly, a durability test under oil-free conditions was initiated. The compressor was run at 2300 RPM and at a discharge pressure of 1176 kPa, and the water temperature was maintained at approximately 80° C. (176° F.). The durability test was halted after 26 hours.

Post-evaluation of the H.V.O.F. sprayed coating indicated that coating integrity was maintained throughout the test. Catastrophic break-up of the coating was not observed, and the $MoS_2$ solid lubricant was retained throughout the coating.

The completion of 26 hours of dry operation without component breakage demonstrates the success of the $MoS_2$ containing composite coating. Production components under similar dry conditions fail in a matter of minutes.

A person of ordinary skill in the art will recognize that many modifications may be made to the present invention without departing from the spirit and scope of the present invention. The embodiments described herein are meant to be illustrative only and should not be taken as limiting the invention, which is defined in the following claims.

We claim:

1. A composite powder for forming a self-lubricating composite coating comprising:
   between about 25–75 vol % of a ceramic powder comprising a carbide;
   between about 5–50 vol % of a metal powder selected from the group consisting of nickel and chromium, and combinations thereof; and,
   between about 2–25 vol % of a solid lubricant powder selected from the group consisting of molybdenum disulfide, lead oxide, graphite, silver, and titanium oxide.

2. The composite powder of claim 1 wherein said ceramic powder comprises chromium carbide.

3. The composite powder of claim 1 wherein said metal powder comprises nickel-chromium.

4. The composite powder of claim 2 wherein said metal powder comprises nickel-chromium.

5. The composite powder of claim 1 wherein said solid lubricant powder comprises molybdenum disulfide.

6. The composite powder of claim 2 wherein said solid lubricant powder comprises molybdenum disulfide.

7. The composite powder of claim 3 wherein said solid lubricant powder comprises molybdenum disulfide powder.

8. The composite powder of claim 4 wherein said solid lubricant powder comprises molybdenum disulfide.

9. A composite powder for forming a self-lubricating composite coating on a cast iron component comprising:
   about 60–70 vol % of chromium carbide powder;
   about 15–25 vol % of a metal powder comprising an equal volume of nickel and chromium; and,
   about 10–20 vol % of molybdenum disulfide powder.

10. A component with a self-lubricating coating comprising:
    a ceramic comprising a carbide;
    a metal selected from the group consisting of nickel, chromium, and combinations thereof; and
    a solid lubricant selected from the group consisting of molybdenum disulfide, lead oxide, graphite, silver, and titanium oxide.

11. The component of claim 10 wherein
    said carbide comprise between about 25–75 vol % of said coating;
    said metal comprises between about 5–50 vol % of said coating; and,
    said solid lubricant comprises between about 2–25 vol % of said coating.

12. The component of claim 10 wherein said ceramic comprises chromium carbide.

13. The component of claim 11 wherein said ceramic comprises chromium carbide.

14. The component of claim 10 wherein said metal comprises a combination of nickel and chromium.

15. The component of claim 11 wherein said metal comprises a combination of nickel and chromium.

16. The component of claim 13 wherein said metal comprises a combination of nickel and chromium.

17. The component of claim 10 wherein said solid lubricant comprises molybdenum disulfide.

18. The component of claim 11 wherein said solid lubricant comprises molybdenum disulfide.

19. The component of claim 13 wherein said solid lubricant comprises molybdenum disulfide.

20. The component of claim 15 wherein said solid lubricant comprises molybdenum disulfide.

21. The component of claim 16 wherein said solid lubricant comprises molybdenum disulfide.

22. A cast iron component with a self-lubricating coating comprising:

about 60–70 vol % chromium carbide;

about 15–25 vol % of a metal comprising an equal volume of nickel and chromium; and about 10–20 vol % molybdenum disulfide.

* * * * *